US011174000B2

(12) United States Patent
Gorgoglione et al.

(10) Patent No.: US 11,174,000 B2
(45) Date of Patent: Nov. 16, 2021

(54) WINDOW WITH AN EMERGENCY EXIT FUNCTION FOR A HELICOPTER AND METHOD FOR REMOVING A TRANSPARENT ELEMENT FROM THIS WINDOW

(71) Applicant: LEONARDO S.P.A., Rome (IT)

(72) Inventors: Giorgio Gorgoglione, Samarate (IT); Gaetano Papaleo, Samarate (IT)

(73) Assignee: LEONARDO S.P.A., Rome (IT)

( * ) Notice: Subject to any disclaimer, the term of this patent is extended or adjusted under 35 U.S.C. 154(b) by 484 days.

(21) Appl. No.: 16/327,201

(22) PCT Filed: Sep. 7, 2017

(86) PCT No.: PCT/IB2017/055392
§ 371 (c)(1),
(2) Date: Feb. 21, 2019

(87) PCT Pub. No.: WO2018/047089
PCT Pub. Date: Mar. 15, 2018

(65) Prior Publication Data
US 2019/0210708 A1  Jul. 11, 2019

(30) Foreign Application Priority Data

Sep. 7, 2016  (EP) ..................... 16187548

(51) Int. Cl.
*B64C 1/32* (2006.01)
*B64C 1/14* (2006.01)
*B64C 27/04* (2006.01)

(52) U.S. Cl.
CPC .............. *B64C 1/32* (2013.01); *B64C 1/1492* (2013.01); *B64C 27/04* (2013.01)

(58) Field of Classification Search
CPC ....... B64C 1/1476; B64C 1/1492; B64C 1/32; B60J 1/004; B60J 1/007; E06B 3/28;
(Continued)

(56) References Cited

U.S. PATENT DOCUMENTS 2,367,035 A   1/1945  McConnell et al.
4,283,885 A * 8/1981  Remick ..................... B60J 9/02
                                                    49/141
(Continued)

FOREIGN PATENT DOCUMENTS

EP      1 958 848      8/2008

*Primary Examiner* — Joshua J Michener
*Assistant Examiner* — Arfan Y. Sinaki
(74) *Attorney, Agent, or Firm* — Leason Ellis LLP (57) ABSTRACT

A window with an emergency exit function for a helicopter is described that comprises: a frame shaped as a framework that can be coupled to a door of said helicopter provided with an opening; and a transparent element designed to engage the opening and held in position by the frame; the frame comprises a first side arranged abutting against the transparent element when a first force below a threshold value is exerted on the latter in a direction transversal to a first plane of a main portion of the transparent element, and which can be elastically moved away from the transparent element when the first force exerted on the latter exceeds the threshold value; and a second side having greater flexural rigidity than the first side in a second plane transversal to first plane and arranged abutting against the transparent element even when the force is greater than said threshold value.

12 Claims, 8 Drawing Sheets

(58) Field of Classification Search
CPC .. E06B 3/5892; E06B 5/02; E06B 2003/7011; E05B 65/1033
USPC .......................................... 296/201, 146.15
See application file for complete search history.

(56) References Cited

U.S. PATENT DOCUMENTS

| | | | |
|---|---|---|---|
| 4,364,209 A | 12/1982 | Gebgard | |
| 6,027,073 A * | 2/2000 | Gratien Ferrier | ..... B64C 1/1492 244/129.3 |
| 6,308,918 B1 | 10/2001 | Ferrier | |
| 8,826,597 B2 * | 9/2014 | Raspic | ..... B64C 1/14 49/475.1 |
| 10,807,706 B2 * | 10/2020 | Joussellin | ..... B64C 27/04 |
| 2012/0241559 A1 | 9/2012 | Ebner et al. | |

* cited by examiner

WINDOW WITH AN EMERGENCY EXIT FUNCTION FOR A HELICOPTER AND METHOD FOR REMOVING A TRANSPARENT ELEMENT FROM THIS WINDOW

CROSS-REFERENCE TO RELATED PATENT APPLICATIONS

This application is a U.S. National Phase Application under 35 U.S.C. § 371 of International Patent Application No. PCT/IB2017/055392, filed Sep. 7, 2017, which claims the priority of European Application No. 16187548.9, filed Sep. 7, 2016, which is incorporated by reference as if expressly set forth in its entirety herein.

TECHNICAL FIELD

The present invention relates to a window with an emergency exit function for a helicopter.

The present invention also relates to a method for removing a transparent element from a window with an emergency exit function.

BACKGROUND ART

In known types of helicopter, it is necessary to provide emergency exits to allow the occupants to quickly abandon the helicopter, for example in the case of an accident.

In some of the known solutions, the normal service exits of the helicopter can also be used as emergency exits.

In further known solutions, windows sufficiently large enough to allow a person to climb through are used as emergency exits.

According to these further solutions, the windows are defined by a door made in the helicopter's fuselage and essentially comprise:

- a frame shaped as a framework coupled to the door at an opening defined by the door itself;
- a transparent element held in position by the frame and engaging the opening defined by the door; and
- a window-frame-shaped seal glued both to the transparent element and to the frame.

In these further solutions, it is obviously necessary to allow the occupants, in case of necessity, to quickly remove the transparent element, normally made of glass or plastic, from the frame.

More specifically, it must be possible to remove the transparent element by applying a force on it that does not exceed a predetermined value, for example 20 kg. it must be possible to apply said force from both the inside and outside of the fuselage.

In the case where the window must be used as an emergency exit, the helicopter's occupants or rescue workers, exert a force on the transparent element so as to break the glue joint by means of a cord and pull the transparent element away from the door.

The applicant has observed that the presence of the glue joint makes it difficult to control the force necessary to remove the transparent element from the window control, with precision and repeatability.

In fact, an excess of glue could raise the value of the force too much, making removal of the transparent element difficult in an emergency.

Conversely, an excessively small quantity of glue could leave the possibility of small movements and vibrations of the transparent element, during the helicopter flight.

Furthermore, the need to provide a cord makes the window unaesthetic.

Finally, the window proves to be particularly heavy and the fitting/replacement operations, of the transparent element require a significant amount of time.

U.S. Pat. No. 2,367,035 discloses a window with an emergency exit function according to the preamble of claim 1, and a method for removing a transparent element from a window with an emergency exit function for a helicopter according to the preamble of claim 10.

DISCLOSURE OF INVENTION

The object of the present invention is to produce a window with an emergency exit function that solves at least one of the above-identified drawbacks associated with known types of windows, in a simple and inexpensive manner.

The above-stated object is achieved by the present invention, in so far as it relates to a window with an emergency exit function, as claimed in claim 1.

The present invention also related to a method for removing a transparent element from a window with an emergency exit function for a helicopter, as claimed in claim 10.

BRIEF DESCRIPTION OF THE DRAWINGS

For a better understanding of the present invention a preferred embodiment is described hereinafter, purely by way of a non-limitative example and with reference to the accompanying drawings, in which.

BEST MODE FOR CARRYING OUT THE INVENTION

Figure 1:
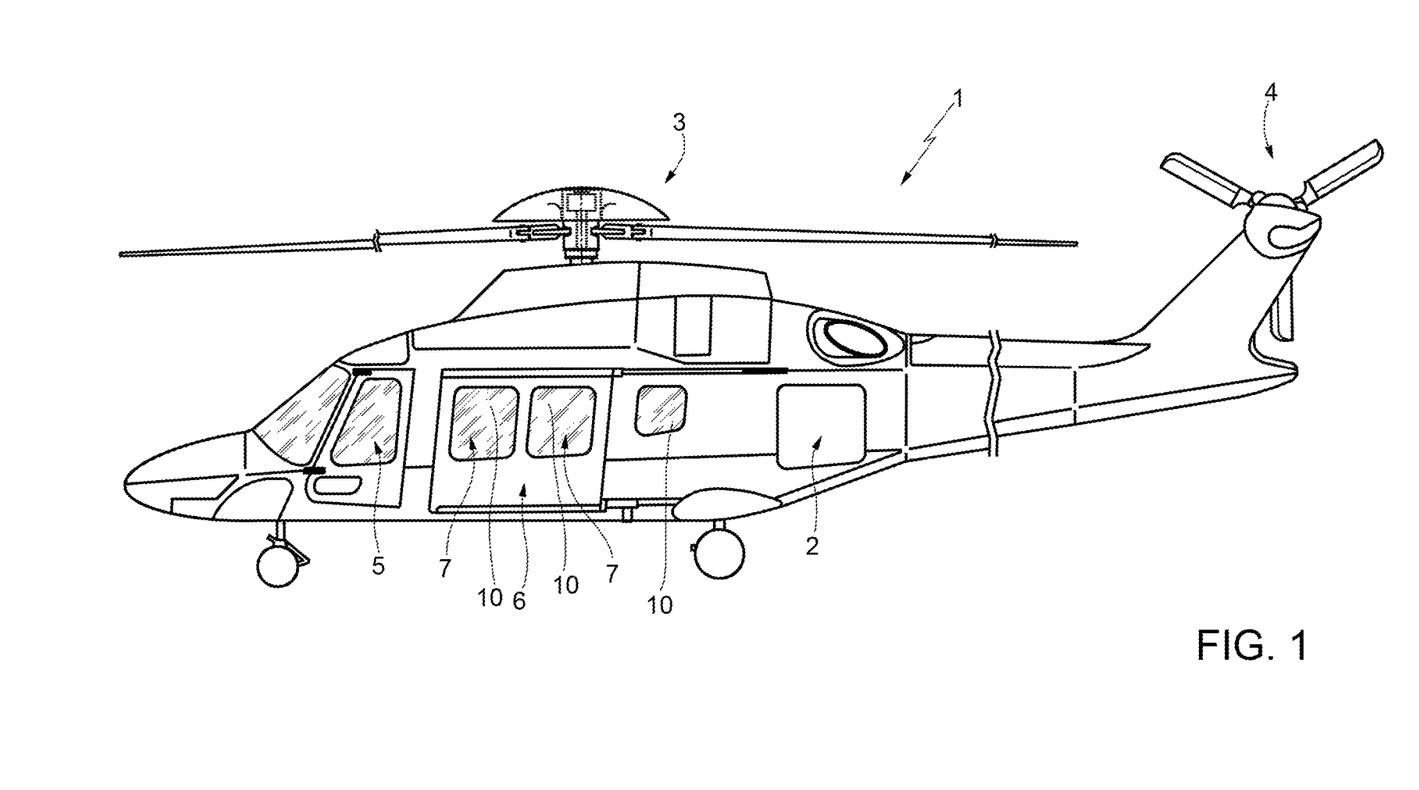
FIG. 1 is a side view of a helicopter comprising a window with an emergency exit function.

Referring to FIG. 1, reference numeral 1 indicates a helicopter. The helicopter 1 essentially comprises a fuselage 2, a main rotor 3 rotating about an axis and a tail rotor 4 located at one end of the fuselage 2 and rotating about its own axis, transversal to the axis of the main rotor.

The fuselage 2 in turn comprises:

- a plurality of exits 5, which can perform the function of emergency exits to allow the occupants of the helicopter 1 to promptly abandon the helicopter 1 in case of necessity; and
- a door 6 defining a plurality of windows 7.

The size of these windows 7 is sufficiently large to allow the occupants of the helicopter 1 to climb through and thus escape.

Thanks to this sizing, the windows 7 also perform the function of emergency exits.

As all the windows 7 are the same, only one window 7 is described hereinafter.

In greater detail, the window 7 comprises (FIGS. 2 and 3):
- a frame shaped as a framework 8 coupled to the door 6 and defining an opening 9; and
- a transparent element 10 engaging the opening 9 and held in position by the frame 8.

Figure 2:
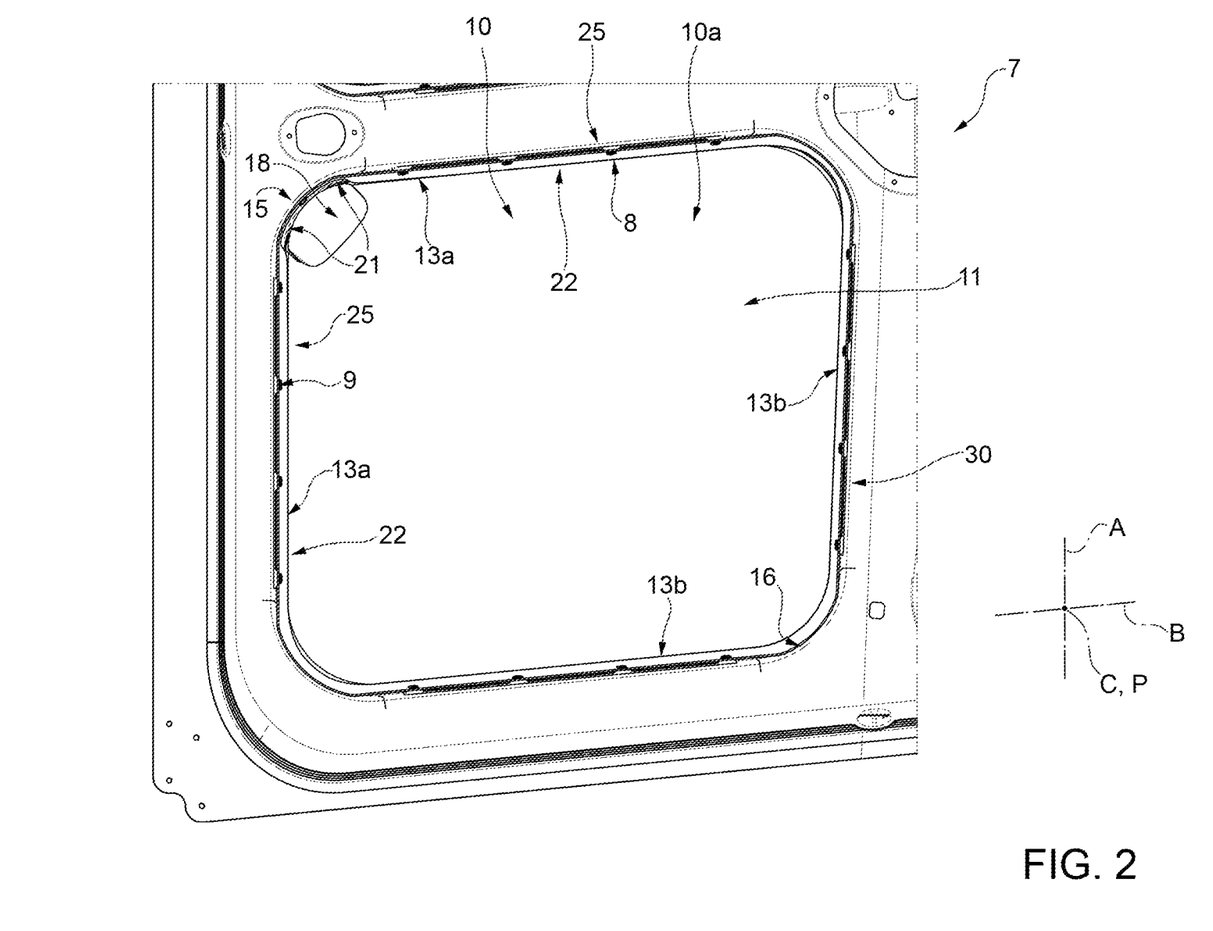
FIG. 2 is a perspective view, on an enlarged scale, of the window in FIG. 1.
Figure 3:
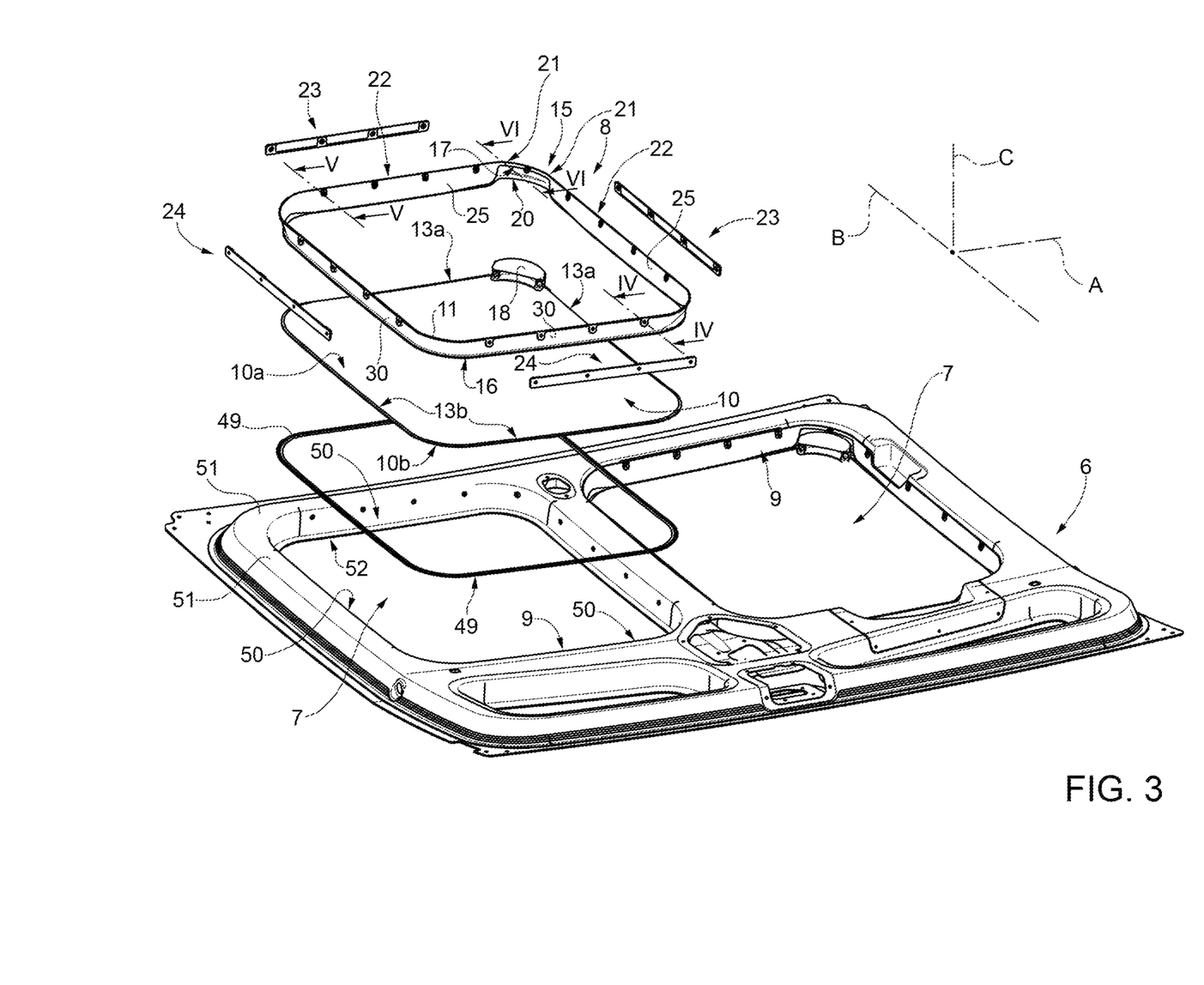
FIG. 3 is an exploded view, on a still further enlarged scale, of a door comprising two windows of the type shown in FIGS. 1 and 2.

In order to perform this emergency exit function, the transparent element 10 must be removable from the frame 8 with a force below a threshold value, for example 20 kg.

This force can be applied from inside the fuselage 2 by the occupants or from outside the fuselage 2 by rescuers.

The transparent element 10 comprises (FIGS. 4 and 5) a main portion 11 lying on a plane P.

Referring to FIGS. 3 to 5 and 9, it is possible to identify:
- a direction A parallel to plane P and corresponding to a direction of extension of the helicopter 1; and
- a direction B parallel to plane P and orthogonal to direction A.

The transparent element 10 also comprises a face 10a arranged on the inner side of the fuselage 2 and a face 10b, opposite to face 10a, arranged on the outer side of the fuselage 2.

The transparent element 10 is made of a plastic material or glass.

The transparent element 10 is delimited by:
- a pair of edges 13a (FIG. 5); and
- a pair of edges 13b (FIG. 4), facing respective edges 13a.

Figure 4:
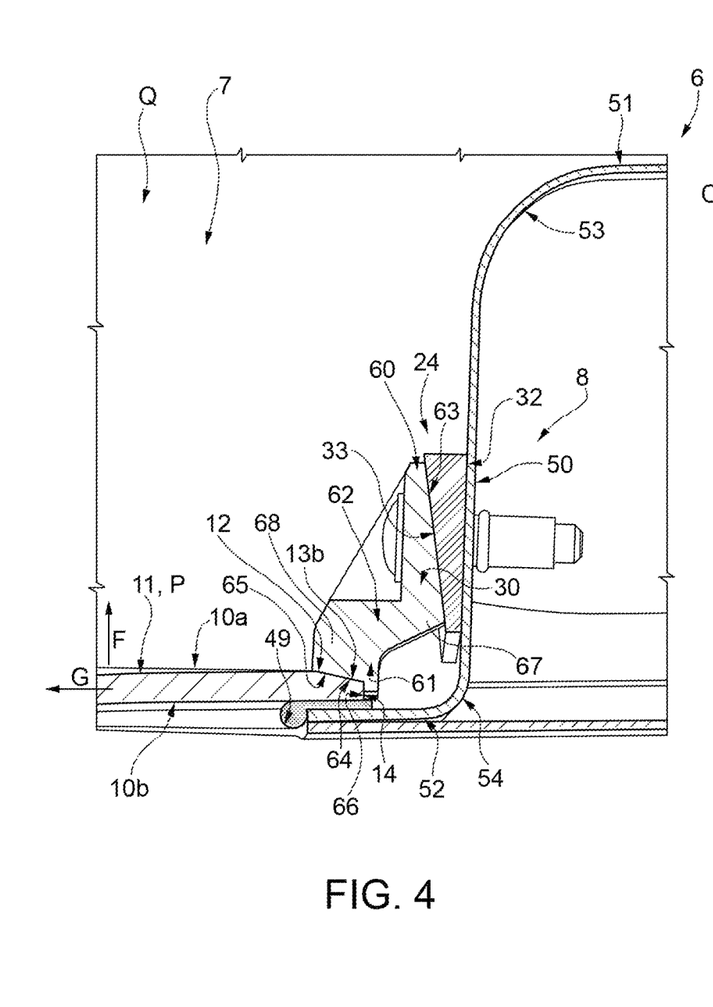
FIGS. 4 to 6 show, on a particularly enlarged scale and in cross-section along planes IV-IV, V-V and VI-VI, respectively, components of the window in FIGS. 1 to 3, with parts removed for clarity.
Figure 5:
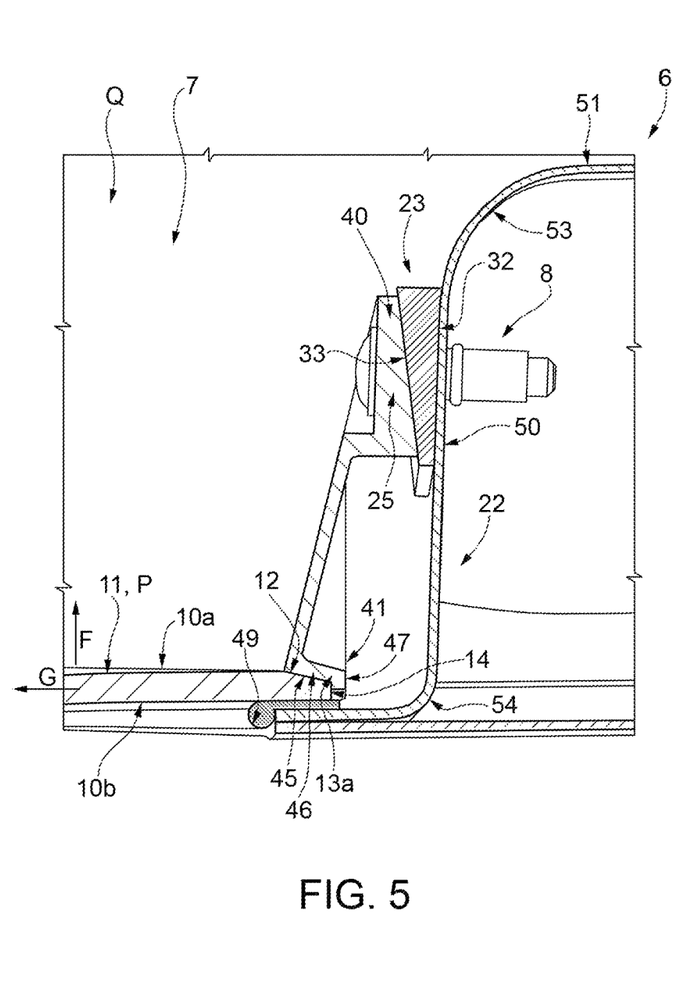

The edges 13a and 13b of each pair extend with one along direction A and the other along direction B.

Figures 6, 11:
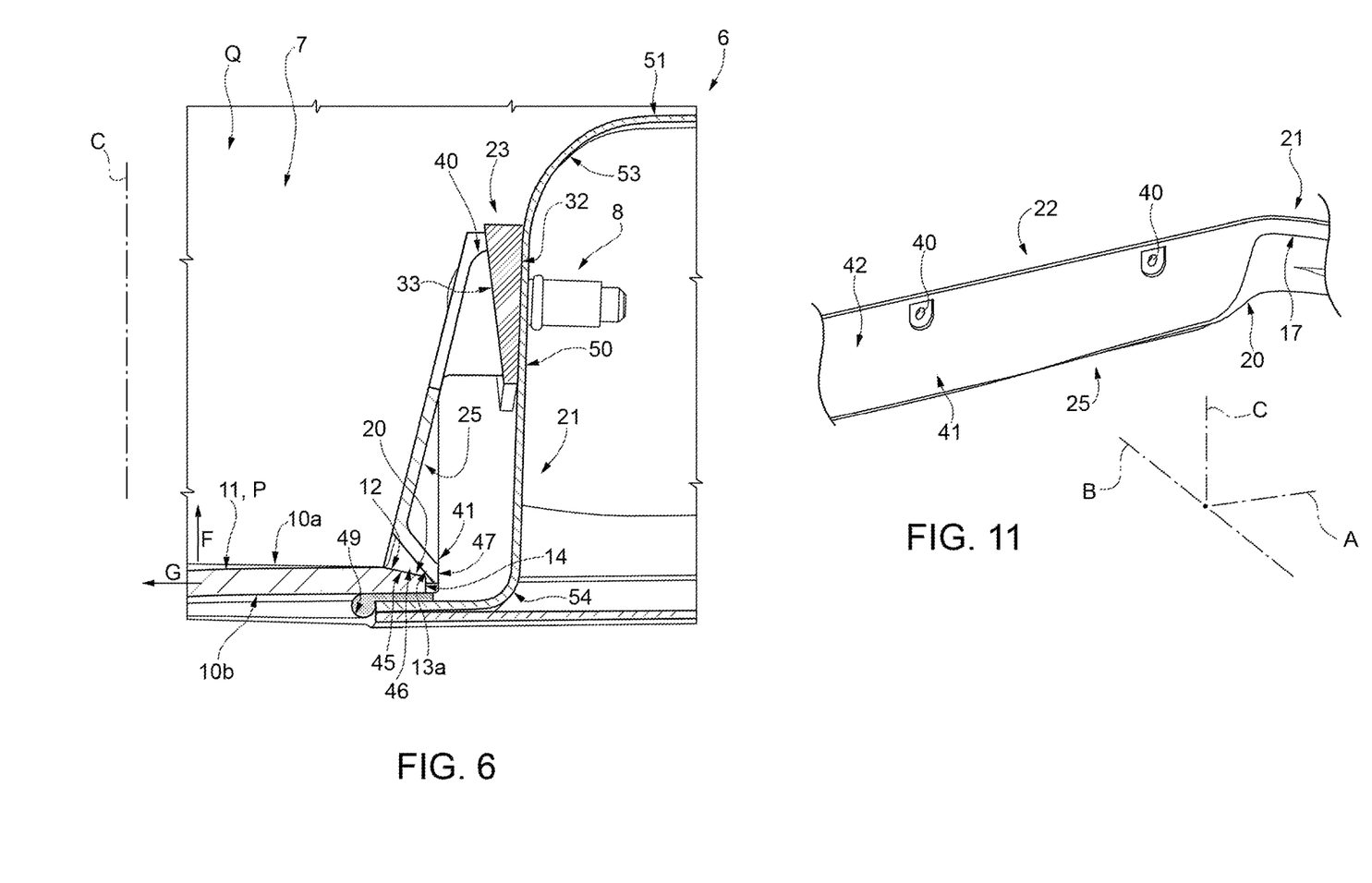
FIG. 11 shows a further detail of the window in FIGS. 1 to 10.

The transparent element 10 comprises, at each edge 13a and 13b (FIGS. 4 to 6):
- a wall 12 adjacent to the main portion 11 and lying on a respective plane inclined with respect to plane P; and
- a wall 14 lying on a plane orthogonal to plane P and which, with wall 12, defines the respective edge 13a or 13b.

The walls 12 converge towards the main portion 11.

The door 6 comprises, for each window 7, (FIG. 3):
- a plurality of walls 50, four in the case shown, arranged like a frame and lying on respective planes orthogonal to plane P;
- a plurality of walls 51, four in the case shown, arranged like a frame on a plane substantially parallel to plane P and arranged on the outer side of the fuselage 2;
- a plurality of walls 52, four in the case shown, facing walls 51 and forming a frame-like shape, and
- curved sections 53 and 54 (FIGS. 4 and 5), which connect walls 50 to walls 51 and 52, respectively.

In particular, (FIGS. 4 and 5), the wall 51 extends from the side of face 10a and wall 52 extends from the side of face 10b of the transparent element 10.

The window 7 also comprises a seal 49 defining a closed profile lying on plane P, formed by four sides and having a shape corresponding to the profile of the transparent element 10.

The seal 49 is interposed, along a direction orthogonal to plane P, between face 10b of the transparent element 10 and wall 52 of the door 6.

The frame 8 is formed like a window frame with a shape substantially corresponding to that of the transparent element 10.

In particular, the frame 8 has a quadrangular shape, rectangular in the case shown.

The frame 8 is connected to walls 50 of the door 6 by means of connection elements 23 and 24, which are shown in FIGS. 3 to 5.

Advantageously, the frame 8 comprises:
- a pair of sides 25 (FIGS. 5, 6 and 11) arranged abutting against the transparent element 10 when a force F transversal to plane P and below the threshold value is exerted on the latter, and which can be elastically moved away from the transparent element 10 when a force greater than the threshold value is value is exerted on the latter, thereby enabling the partial detachment of the transparent element 10 from the frame 8 itself; and
- a pair of sides 30 (FIG. 4) having flexural rigidity in a plane Q transversal to plane P greater than the sides 25 arranged abutting against the transparent element 10, even when the force F exerted on the latter is greater than the threshold value.

In the case shown, sides 25 and 30 are shaped like tongues.

Furthermore, in the case shown, the frame 8 is made of a plastic material and sides 25 are thin-walled.

Sides 25 are adjacent to each other and converge in a corner 15 of the frame 8.

Sides 30 are adjacent to each other, interposed between sides 25, and converge in a corner 16, opposite to corner 15, of the frame 8.

The corners 15 and 16 are curved and connect the respective sides 25 and 30 to each other.

Sides 25 and 30 extend along direction A and the other along direction B, and have a height along a direction C orthogonal to plane P.

Sides 25 have, at corner 15, a release 17 engaged by a handle 18 carried by the transparent element 10.

Sides 25 are arranged abutting against and overlapping the edges 13a of the transparent element 10, when force F is below the threshold value (FIG. 5).

Sides 30 are arranged abutting against and overlapping edges 13b of the transparent element 10 (FIG. 4).

The transparent element 10 is also fitted with the handle 18, which is positioned in corner 15.

The handle 18 protrudes from face 10a of the transparent element 10 towards the inside of the fuselage 2.

In addition to the respective walls 50, the connection elements 23 and 24 are also connected to sides 25 and 30, respectively, of the frame 8.

The connection elements 23 and 24 are shaped (FIGS. 3 to 6) like wedges, each delimited by:
- a respective surface 32 abutting against wall 50 of the door 6 and parallel to said wall 50;
- a respective surface 33, opposite to surface 32 and inclined with respect to plane P.

Surface 33 converges towards wall 50, when proceeding orthogonally to plane P from wall 51 towards the wall 52.

Sides 25 comprise respective sections 21 (FIG. 6) converging in the corner 15 and respective sections 22 (FIG. 5) opposite to the corner 15, i.e. arranged at the side of the handle 18 (FIG. 3).

Each side 25 essentially comprises (FIGS. 3 to 6, 10 and 11):
- a plurality of end portions 40 fixed to the connection element 23 at respective anchor points spaced out from each other along the respective direction A or B; and
- an end portion 41 opposite to portion 40, which is designed to press respective walls 12 and 14, converging to the respective edge 13a of the transparent element 10, against wall 52 of the door 6 when force F is below the threshold value.

When force F is below the threshold value, portion 41 is arranged abutting against the transparent element 10 at each section 22 and is spaced apart from the transparent element 10 at each section 21.

More specifically, at each section 22, portion 41 defines a shoulder 45 engaged by edge 13a of the transparent element 10.

In particular, the shoulder 45 is defined by a pair of walls 46 and 47 converging to each other in a corner.

When force F is below the threshold value, wall 46 is arranged abutting against the respective wall 12 of the transparent element 10, while wall 47 is normally arranged abutting against the respective wall 14 of the transparent element 10.

The walls 46 and 12 overlapping each other are flat.

More specifically, walls 46 and 12 progressively move away from face 10b of the transparent element 10, starting from edge 13a and proceeding towards the main portion 11 of the transparent element 10.

Conversely, section 21 of each side 25 comprises a recess 20 (FIGS. 6 and 11) delimiting the release 17 and shaped so as to maintain the distance between section 21 and the transparent element 10.

In other words, portion 41 of each side 25 is interrupted at the respective section 21.

The recess 20 thus defines a trigger zone for bending side 25 in the area of the handle 18 following the application of a force F on the transparent element 10.

In the case where force F is below the threshold value, the transparent element 10 fails to move sides 25 along the direction C.

In this condition, the transparent element 10 thus remains fixed to the door 6 by sides 25 and 30.

Conversely, in the case where force F is greater than the threshold value, the transparent element 10 is able to move the sections 21 of sides 25 transversely to the direction C due to the presence of the recess 20 and cause the consequent elastic bending of sides 25 in plane Q. In this condition, wall 12 of the transparent element 10 becomes disengaged from side 25 and therefore from the frame 8, also on sections 22 of sides 25.

Each side 30 essentially comprises (FIG. 4):
- an end portion 60 fixed to the connection element 24 at a plurality of connection sections;
- an end portion 61, which is opposite to portion 60 and is designed to press a respective wall 14 of the transparent element 10 against the door 6; and
- a portion 62, which is interposed between sections 60 and 61.

Furthermore, portion 60 is delimited along the respective direction A or B by a surface 63 arranged abutting against surface 33 of the respective connection element 24.

Portion 61 defines a shoulder 64, which is engaged by walls 12 and 14 of edge 13b of the transparent element 10.

In particular, shoulder 64 è defined by a pair of walls 65 and 66 converging to each other in a corner.

Wall 65 is arranged abutting against wall 12 of the respective edge 13b, while wall 66 is arranged abutting against wall 14 of the respective edge 13b, for all values of force F.

In particular, wall 65 is shaped quite similarly to wall 14, i.e. it is inclined with respect to plane P and converges from wall 66 towards the main portion 11.

Portion 62 is L-shaped and in turn comprises, proceeding from portion 60 towards portion 61:
- a section 67 with an extension mainly parallel to plane P and orthogonal to wall 50; and
- a section 68 thinner than section 67 orthogonally to wall 50.

The shape of portions 61 and 62, particularly thick on plane P with respect to sides 25, gives side 30 a much greater flexural rigidity in plane Q than the flexural rigidity of the sides 25 in response to a force F orthogonal to plane P.

It follows that even when force F is greater than the threshold value, portions 60, 61, and 62 do not elastically alter their position significantly and continue to press walls 12 and 14 of edge 13b against seal 49 and wall 52 of the door 6.

However, when force F is greater than the threshold value and wall 12 is no longer constrained by side 25 against the door 6, the transparent element 10 can be easily detached from side of the frame 8 by a force G (FIGS. 4 and 9) having a direction lying in plane P and oriented so as to pull the transparent element 10 away from sides 30 and from walls 50.

This is due to the fact that wall 65 does not constrain walls 12 and 14, converging to edge 13b of the transparent element 10, in any way when force G is applied to the latter with its main component in plane P and oriented in the opposite direction to wall 50 of the door 6.

In particular, walls 65 and 14 are configured so as to move away from face 10b of the transparent element 10, starting from edge 13b and proceeding towards the main portion 11 of the transparent element 10.

Furthermore, the window 7 also comprises a plurality of connection elements 70 (FIG. 7), which are configured to support the aerodynamic loads acting on the transparent element 10 and to allow the removal of the transparent element 10 from the door 6 when force F exceeds the threshold value.

This is possible because the aerodynamic loads are generally lower than the above-stated threshold value.

Figure 7:
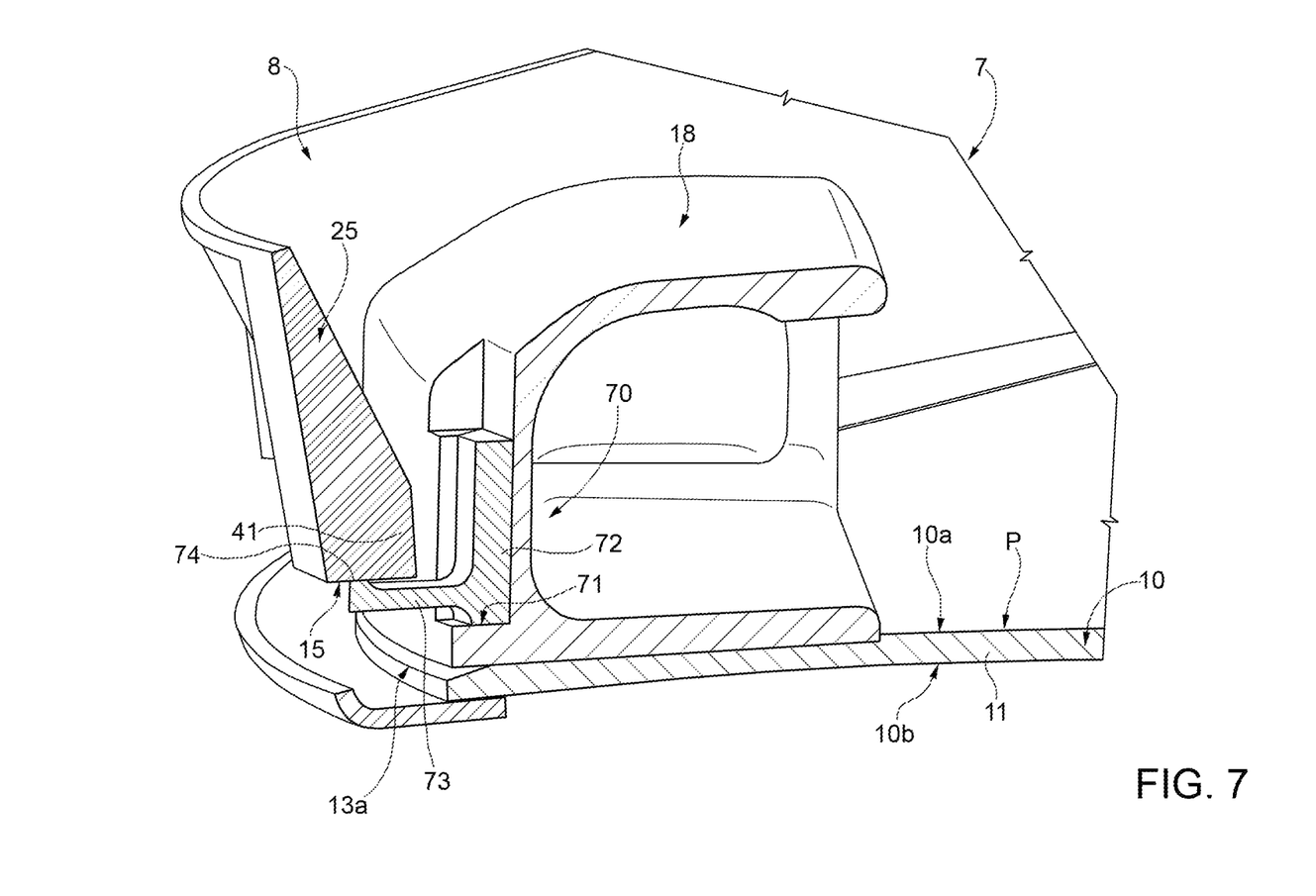
FIGS. 7 to 9 show perspective views of further details of the window in FIGS. 1 to 6.
Figure 8:
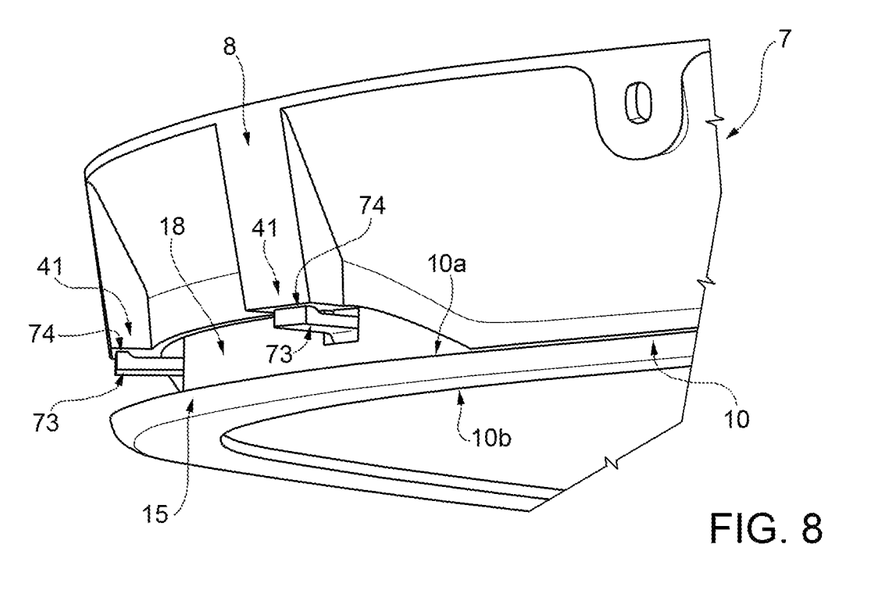
Figure 9:
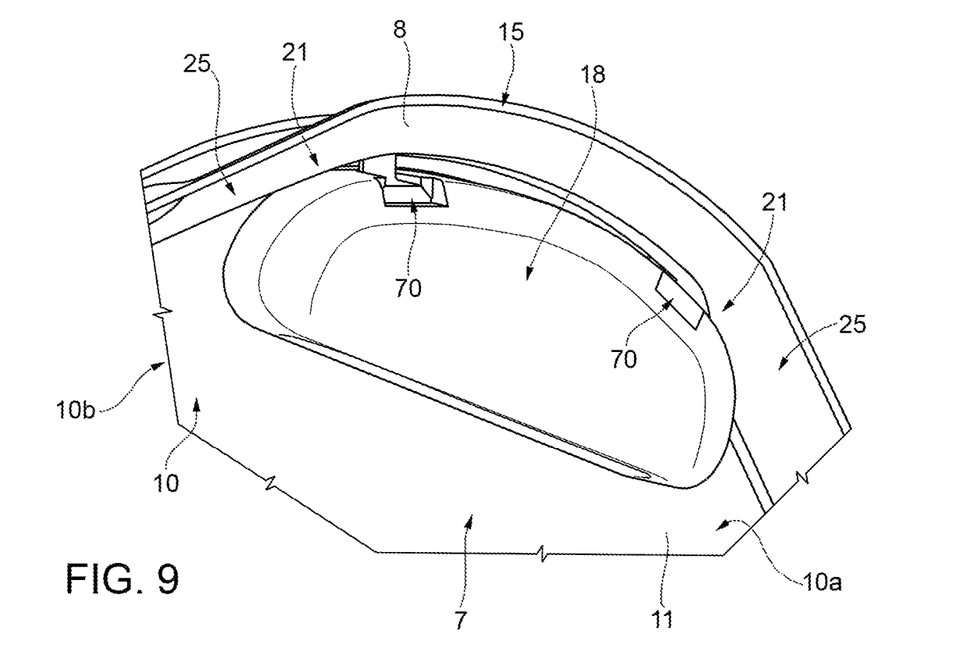

Each connection element 70 is arranged in corner 15 of the transparent element 10.

Each connection element 70 is an insert, housed inside a seat 71 of the handle 18.

Each connection element 70 essentially comprises:
- a section 72 substantially orthogonal to plane P, housed in the seat 71 and connected to the handle 18, by means of a dovetail coupling in the case shown; and
- an arm 73 transversal to section 72, extending parallel to plane P and having an end 74 opposite to section 72 abutting against side 25 of the frame 8.

In particular, end 74 is interposed between face 10a of the transparent element 10 and portion 41 of side 25.

The connection elements 70 are sized so as to resist, under the action of aerodynamic loads, force values below the threshold value.

More specifically, the arm 73 of each connection element 70 is sized so as to be able to support aerodynamic loads acting on face 10b and to hold the transparent element 10 in position, due to the abutment between end 74 and portion 41.

Conversely, in the case where force F is greater than the threshold value, the arm 73 breaks, enabling removal of the transparent element 10.

In the case shown, the connection elements 70 are fixed to the transparent element 10 on edge 13b.

Operation of the window 7 is described below in detail.

In the case where the occupants must quickly abandon the helicopter 1, for example in the case of an accident, the window 7 is used as an emergency exit. More specifically, the occupants simply remove the transparent element 10 from the door 6 and climb through the opening 9 freed of the transparent element 10. In an entirely similar manner, the transparent element 10 can be removed from outside the helicopter 1 by rescue workers.

The removal of the transparent element 10 from the door 6 takes place by exerting a force F greater than the threshold value on the handle 18—or on face 10b of the transparent element 10 itself—in a direction orthogonal to plane P and directed towards the inside of the fuselage 2, and then exerting a force G with the main component parallel to plane P on the transparent element 10 itself in a direction away from sides 30 of the frame 8.

More specifically, when force F is greater than the threshold value, and also thanks to the presence of the recess 20, the transparent element 10 is able to move sections 21 of sides 25 arranged in the zone of the handle 18 transversely to direction C.

This also allows the elastic bending of sections 22 of sides 25 in the respective planes Q and moving away portions 40 and 41 of sides 25 of the door 6. It follows that application of force F greater than the threshold value disengages walls 12 and 14 of edges 13a of the transparent element 10 from sides 25 of the frame 8.

Figure 10:
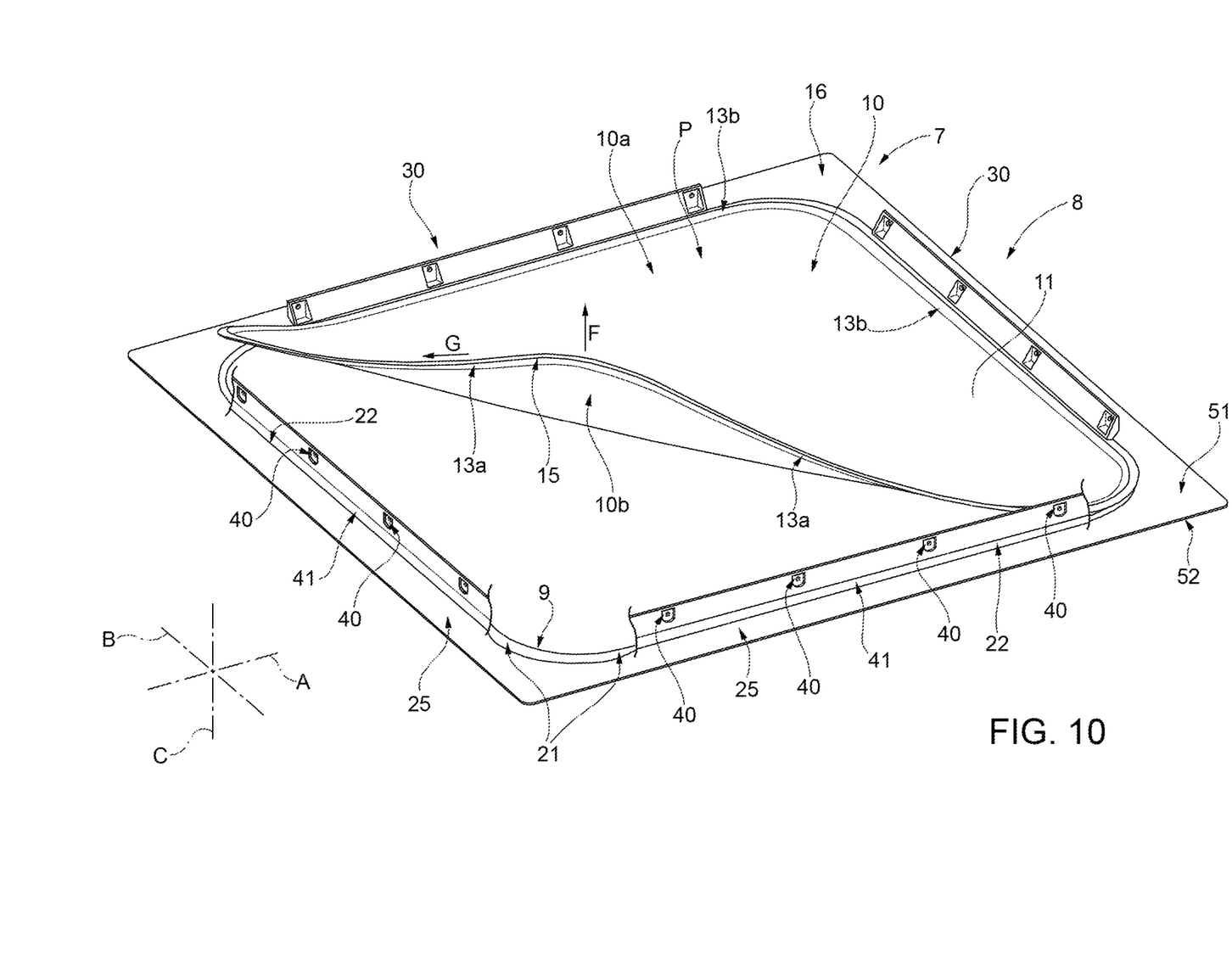
FIG. 10 shows a perspective view of the window in FIGS. 1 to 9, during a phase of its removal.

In this condition, the transparent element 10 is only constrained to the frame 8 by sides 30, as shown in FIG. 10.

These sides 30, due to the greater flexural rigidity with respect to sides 25, constrain the transparent element 10 to the frame 8 even when force F is greater than the threshold value.

Nevertheless, sides 30 do not prevent subsequent detachment of the transparent element 10 following the application of a force G having a main component parallel to plane P.

This is because wall 65 is shaped so as not to restrain wall of the transparent element 10 along the above-stated direction parallel to plane P when a force G is applied in a direction away from side 30.

Hence, the application of force G enables easily detaching the transparent element 10 from sides 30.

At this point, the transparent element 10 is completely removed from the door 6 and no longer occupies the opening 9, which can be used to evacuate the fuselage 2.

During normal operation of the helicopter 1, the connection element 70 prevents the aerodynamic loads acting on face 10b of the transparent element 10 from causing undesired fortuitous removal of the transparent element 10 from the door 6.

In fact, under the action of these aerodynamic loads on face 10b of the transparent element 10, end 74 is pressed against portion 41 of side 25 and arm 73 is subjected to stress below its breaking load.

Conversely, when a force F greater than the threshold value is exerted on the handle 18 or on face 10b, the arm 73 breaks, allowing removal of the transparent element 10 from the sides 25 of the frame 8.

From examination of the characteristics of the window 7 and the method according to the present invention, the advantages that can be achieved therewith are evident.

In greater detail, the frame 8 of the window 7 comprises:
a pair of sides 25 arranged abutting against the transparent element 10 when a force F transversal to plane P and below the threshold value is exerted on the latter, and which can be elastically moved away from the transparent element 10 when the force F exerted on the latter is greater than the threshold value, so as to enable the partial detachment of the transparent element 10 from the frame 8; and
a pair of sides 30 arranged abutting against the transparent element 10 even when a force F greater than the threshold value is exerted on the latter.

In this way, unlike the known solutions discussed in the introductory part of this description, the window 7 does not require any glue joint to be broken to enable pulling the transparent element 10 away from the door 6.

On the contrary, the transparent element 7 is removed from the frame 8 by simply applying force F transversal to plane P so as to elastically bend and move sides 25, away from sides 30, and then also detach the transparent element 10 from sides 30 by applying a force G parallel to plane P.

This elastic divarication is facilitated by the recess 20 defined by sections 21 of sides 25. In fact, thanks to this recess 20, the transparent element 10 moves sections 21 of sides 25 transversely to direction C, causing the elastic deformation of the entire sides 25.

As a consequence, the value of force F is controllable with high precision and repeatability. A window 7 is thus obtained that has a transparent element 10 substantially free of vibrations during flight of the helicopter 1 and, at the same time, easily allows removal of the transparent element 10 in case of necessity.

Moreover, due to the fact that wall 65 is shaped so as not to hold wall 12 of the transparent element 10 in a direction parallel to plane P, also the force G necessary to remove the transparent element 10 from sides 30 is particularly low. In other words, once a force F greater than the threshold value is applied, the transparent element 10 is detached almost naturally by applying force G.

Moreover, the window 7 can be completely installed from inside the fuselage 2, by simply:
interposing edges 13a and walls 12 and 14 converging thereon between sides 25 and the seal 49; and
interposing edges 13b and walls 12 and 14 converging thereon between sides 30 and the seal 49.

As it is entirely devoid of a cord or other movable members necessary for removing the transparent element 10, the window 7 has a particularly pleasing aesthetic effect and does not negatively affect the aerodynamic profile of the fuselage 2.

Furthermore, the window 7 has a much lower weight—approximately 50%—than the solutions discussed in the introductory part of this description, with evident advantages in weight reduction and/or increase in payload of the helicopter 1.

Finally, it is clear that modifications and variants can be made regarding the window 7 and method described and illustrated herein without departing from the scope defined by the claims.

The invention claimed is:

1. A window (7) with an emergency exit function for a helicopter (1), comprising:
a frame shaped as a framework (8) that can be coupled to a door (6) of said helicopter provided with an opening (9); and
a transparent element (10) designed to engage said opening (9) and held in position by said frame (8); characterized in that said frame (8) comprises:
at least two first rims (25), which are adjacent to each other and are coincident at a corner (15) in which a recess (20) is made for housing a handle (18) carried by said transparent element (10) and operable to exert said first force (F) on said transparent element (10); each said first rim (25) being arranged, at least in part, abutting against said transparent element (10) when a first force (F) having a value below a threshold value is exerted, in use, on the transparent element (10) in a direction transversal to a first plane (P) of a main portion (11) of the transparent element (10), and being elastically movable away from said transparent element (10) when said first force (F) is exerted, in use on the transparent element (10) with a value exceeding said threshold value; and at least two second rims (30), which are adjacent to each other and opposite to said first rims respectively; each second rim (30) having greater flexural rigidity than said first rims (25) in a second plane (Q) orthogonal to said first plane (P) and being arranged abutting against said transparent element (10) even when the value of said force (F) is greater, in use, than said threshold value.

2. The window according to claim 1, wherein each said first rim (25) integrally comprises:

a first portion (40) fixable to said door (6); and
a second portion (41), opposite to said first portion (40); said second portion (41) in turn integrally comprising:
a first section (21) defining said recess (20) and spaced apart from said transparent element (10) even when said first force (F) is applied to the transparent element with a value below said threshold value; and
a second section (22) arranged adjacent to an associated said second rim (30) and on another end of said recess (20);
said second section (22) being arranged abutting against said transparent element (10) when said first force (F) is applied to the transparent element with a value below said threshold value.

3. The window according to claim 1, wherein each said second rim (30) integrally comprises:

a third section (60) fixable to said door (6); and
a fourth section (61), opposite to said third section (60), and cooperating with said transparent element (10).

4. The window according to claim 1, wherein said transparent element (10) comprises:

first walls (12) inclined with respect to said plane (P) and arranged peripherally to said main portion (11); and
second walls (14) defining, with respective said first walls (12), at least a first and a second edge (13a, 13b) of said transparent element (10);
said first edge (13a) being arranged abutting against said first rim (25) of said frame (8) when the value of said first force (F) is below said threshold value;
said second edge (13b) being arranged abutting against said second rim (30) of said frame (8).

5. The window according to claim 1, wherein said transparent element (10) comprises a first face (10a) and a second face (10b) opposite to said first face (10a);

said first face (10a) defining said first walls (12);
said second rims (30) comprising third walls (65) abutting against said first walls (12);
said first walls (12) and said third walls (65) extending away from said second face (10b), when proceeding from the respective first walls (12) towards said main portion (11).

6. The window according to claim 1, further comprising a first connection element (23) and a second connection element (24), which can be connected to said door (6) and are connected to said first and second rims (25, 30), respectively;

said first connection element (23) and said first rim (25) respectively comprising first surfaces (33) abutting against each other and extending along an inclined direction with respect to a direction orthogonal to said plane (P);
said second connection element (24) and said second rim (30) respectively comprising second surfaces (33; 63) abutting against each other and extending along an inclined direction with respect to a direction orthogonal to said plane (P).

7. The window according to claim 1, further comprising at least one connection element (70) able to support said force (F) having a value below said threshold value and interposed between said transparent element (10) and said door (6).

8. The window according to claim 7, wherein said connection element (70) comprises:

a first section (72) housed in a seat of said handle (18); and
a second section (73) abutting against said frame (8) and frangible following application of said first force (F) with a value below said threshold value.

9. A helicopter (1) comprising:

a window (7) with an emergency exit function for said helicopter (1), comprising:
a frame shaped as a framework (8) coupled to a door (6) of said helicopter provided with an opening (9); and
a transparent element (10) designed to engage said opening (9) and held in position by said frame (8); characterized in that said frame (8) comprises:
at least two first rims (25), which are adjacent to each other and are coincident at a corner (15) in which a recess (20) is made for housing a handle (18) carried by said transparent element (10) and operable to exert said first force (F) on said transparent element (10); each said first rim (25) being arranged, at least in part, abutting against said transparent element (10) when a first force (F) having a value below a threshold value is exerted, in use, on the transparent element (10) in a direction transversal to a first plane (P) of a main portion (11) of the transparent element (10), and being elastically movable away from said transparent element (10) when said first force (F) is exerted, in use on the transparent element (10) with a value exceeding said threshold value; and
at least two second rims (30), which are adjacent to each other and opposite to said first rims respectively; each second rim (30) having greater flexural rigidity than said first rims (25) in a second plane (Q) orthogonal to said first plane (P) and being arranged abutting against said transparent element (10) even when the value of said force (F) is greater, in use, than said threshold value; and
said door (6) defining said opening (9).

10. A method for removing a transparent element (10) from a window (7) with an emergency exit function for a helicopter (1);

said window (7) comprising a frame (8) that can be coupled to a door (6) of said helicopter (1) and designed to hold said transparent element (10) in position;
said method comprising the steps of:
i) maintaining said transparent element (10) abutted against at least a part of two first rims (25) and against two second rims (30) of said frame (8), when a first force (F) having a value below a threshold value is exerted on said transparent element (10) in a direction transversal to a first plane (P) of a main portion (11) of said transparent element (10);
said first rims (25) being adjacent to each other and being coincident at a corner (15) in which a recess (20) is made for housing a handle (18) carried by said transparent element (10) and operable to exert said first force (F) on said transparent element (10);
said second rims (30) being adjacent to each other and opposite to said first rims respectively; said second rims (30) having greater flexural rigidity than said first rims (25) in a second plane (Q) orthogonal to said first plane (P);

said method further comprising the steps of:

ii) elastically moving said first rims (25) away from said transparent element (10), when the value of said first force (F) is greater than said threshold value, so as to free said transparent element (10) from said first rims (25); and iii) maintaining said transparent element (10) abutted against said second rims (30), when the value of said first force (F) is greater than said threshold value.

11. The method according to claim 10, wherein said step of elastically moving said first rims (25) away from said transparent element (10), when the value of said first force (F) is greater than said threshold value, so as to free said transparent element (10) from said first rims (25) comprises the steps of:

iv) moving first sections (21) of said first rims (25) by means of said transparent element (10) following application of said first force (F) exceeding said threshold value; and v) determining the displacement of said first section (21) transversely to said first force (F);

said first section (21) defining a recess (20) spaced apart from said transparent element (10) even when said first force (F) is applied to the latter with a value below said threshold value;

said step v) allowing the elastic bending of second sections (22) of said first rims (25) in said second plane (Q) and moving away first and second portions (40, 41) of said first rims (25) from said door (6);

each said first rim (25) integrally comprising:

said first portion (40) fixable to said door (6); and said second portion (41), opposite to said first portion (40);

said second portion (41) in turn integrally comprising:

said first section (21); and said second section (22) arranged adjacent to an associated said second rim (30) and on another end of said recess (20);

said second section (22) being arranged abutting against said transparent element (10) when said first force (F) is applied to the transparent element with a value below said threshold value.

12. The method according to claim 10, further comprising at least one of: a step vii) of removing said transparent element (10) from said second side (30) by exerting a second force (G) with a component parallel to said plane (P); and a step viii) of operating a handle (18) carried by said transparent element.

\* \* \* \* \*